United States Patent
Wey et al.

(12) 
(10) Patent No.: US 6,586,543 B1
(45) Date of Patent: Jul. 1, 2003

(54) PROCESS FOR THE PREPARATION OF SUBSTANTIALLY AMORPHOUS POLY-α-OLEFINS

(75) Inventors: Hans Guenther Wey, Muelheim (DE); Norbert Schlueter, Gescher (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/654,700

(22) Filed: Sep. 1, 2000

(30) Foreign Application Priority Data

Sep. 1, 1999 (DE) .......................................... 199 41 591
Jun. 27, 2000 (DE) .......................................... 100 31 293

(51) Int. Cl.$^7$ ................................................ C08F 4/44
(52) U.S. Cl. ........................ 526/138; 526/135; 526/137; 526/142; 526/144; 526/157; 526/158; 526/124.2; 526/124.3; 526/124.7; 526/348; 526/348.4; 526/348.5; 526/348.6; 526/123.1; 502/120; 502/127; 502/128; 502/119
(58) Field of Search .................... 526/123.1, 124.1, 526/125, 135, 124.3, 124.7, 348.4, 348.5, 348.6, 124.2, 138; 502/120

(56) References Cited

U.S. PATENT DOCUMENTS

| | | | | |
|---|---|---|---|---|
| 4,016,344 A | * | 4/1977 | Kochhar et al. | 526/124 |
| 4,312,782 A | * | 1/1982 | Mink et al. | 252/429 B |
| 4,347,158 A | * | 8/1982 | Kaus et al. | 252/429 B |
| 4,368,306 A | * | 1/1983 | Kurz | 526/125 |
| 4,380,508 A | * | 4/1983 | Shipley et al. | 252/431 C |
| 4,397,763 A | * | 8/1983 | Welch | 252/429 B |
| 4,439,540 A | * | 3/1984 | Cecchin et al. | 502/125 |
| 4,451,626 A | * | 5/1984 | Shipley et al. | 526/122 |
| 4,469,855 A | * | 9/1984 | Cooper | 526/106 |
| 4,555,496 A | * | 11/1985 | Agapiou et al. | 502/105 |
| 4,826,939 A | * | 5/1989 | Stuart | 526/348.5 |
| 4,847,340 A | * | 7/1989 | Allen et al. | 526/125 |
| 4,859,757 A | * | 8/1989 | Pellon et al. | 526/348 |
| 4,983,694 A | * | 1/1991 | Furtek | 526/125 |
| 4,990,477 A | * | 2/1991 | Kioka et al. | 502/107 |
| 5,731,393 A | * | 3/1998 | Kojoh et al. | 526/124.8 |
| 5,962,615 A | * | 10/1999 | Kojoh et al. | 526/348.2 |
| 6,080,828 A | * | 6/2000 | Kojoh et al. | 526/352 |

FOREIGN PATENT DOCUMENTS

EP 0 355 484 A1 * 10/1989 ......... C08F/210/06

OTHER PUBLICATIONS

H.G. Wey, "Vestoplast—Amorphous Polyalphaolefins Properties and Applications in the Formulation of Hot Melt Adhesives", European Industrial Adhesives Conference, Apr. 26–28, 1995, updated reprint, Aug. 1995.

* cited by examiner

*Primary Examiner*—D. R. Wilson
*Assistant Examiner*—Rip A. Lee
(74) *Attorney, Agent, or Firm*—Oblon, Spivak, McClelland, Maier & Neustadt, P.C.

(57) ABSTRACT

The present invention provides a process for preparing a substantially amorphous poly-α-olefin, which includes:

a) preforming a solid catalyst and, optionally, a first amount of a trialkylaluminum cocatalyst, by contacting the catalyst and optionally the cocatalyst with at least one selected from the group including oxygen and a compound which includes active oxygen, to form a preformed catalyst,
   wherein the solid catalyst includes magnesium, aluminum and titanium, and
   wherein said trialkylaluminum cocatalyst includes 1 to 9 carbon atoms in each alkyl group;

b) contacting the preformed catalyst with a second amount of the cocatalyst, wherein a molar ratio of trialkylaluminum to the titanium ranges from 40:1 to 700:1, to form a catalyst mixture;

c) polymerizing, in the liquid phase, with the catalyst mixture, an olefin or an olefin mixture at a temperature between 30 and 160° C., to produce the poly-α-olefin. The invention also provides a preformed catalyst for preparing a substantially amorphous poly-α-olefin, which is prepared the above process step (a). By the present invention, it is possible to avoid the disadvantages associated with conventional methods and prepare a substantially amorphous poly-α-olefin with a substantially improved space-time yield in a wide temperature range and with a more uniform course of reaction.

20 Claims, No Drawings

PROCESS FOR THE PREPARATION OF SUBSTANTIALLY AMORPHOUS POLY-α-OLEFINS

BACKGROUND OF THE INVENTION

1. Field of the Invention

The invention relates to a process for the preparation of substantially amorphous poly-α-olefins with improved space-time yield under controlled reaction conditions.

2. Discussion of the Background

In the adhesives industry, a large number of substantially amorphous poly-α-olefins have for many years been used as adhesive raw materials for a very wide range of applications. Here, the applications range from the hygiene sector and lamination through the packaging sector to structural adhesive bonds and the furniture industry. In most of these applications, these adhesive raw materials are distinguished by high adhesion to a very wide range of substrates, strong cohesion and good resistance to chemicals in combination with an excellent price/performance ratio.

Increasingly in demand on the market in the case of modern hotmelt adhesives are the properties of good sprayability, outstanding bonding properties immediately after application and as far as possible little formulation effort. Particularly suitable for these requirements are low viscosity products having a viscosity of 400–15,000 mPas at 190° C. and a needle penetration of from 18 to 90×0.1 mm at 25° C.

The preparation of products in this viscosity range is described in EP-A-0 023 249. However, with the $TiCl_3$ catalysts used there, only comparatively hard products having a needle penetration of up to not more than 25×0.1 mm at 25° C. can be prepared. For precise adjustment of the bonding properties, such products must be formulated with further adhesive raw materials, such as resins and waxes. Owing to the required additional cost for the adhesive producer, this constitutes a considerable cost disadvantage.

A process for the preparation of such soft and low-viscosity products is described in EP-A-0 335 484. In this process, a magnesium chloride support is milled with aluminum trichloride to produce a supported catalyst, and the product is further milled with titanium tetrachloride; the mixture is then activated with a trialkylaluminum cocatalyst. However, the process disclosed there is only of very limited use in industry since polymerization can be effected only in a very narrow temperature range, which in practice gives rise to considerable measurement and regulation effort. This is particularly complicated by the nonuniform activity behavior of the catalyst described there over the reaction time; at the beginning of the reaction, the polymerization takes place very rapidly with considerable heat evolution, but the catalyst activity declines rapidly and then falls relatively rapidly to a level which is too low for an industrial process. The nonuniform activity behavior is problematic not only in the case of batchwise polymerization but also in a continuous process where in particular the rapid decline in the activity is a problem and leads to an unsatisfactory space-time yield. In addition, the reaction is intended to take place at comparatively low temperatures; owing to the heat removal required, this is disadvantageous in terms of energy and further increases the control effort.

SUMMARY OF THE INVENTION

Surprisingly, it is now possible to avoid the above-mentioned disadvantages and prepare a substantially amorphous poly-α-olefin with a substantially improved space-time yield in a wide temperature range and with a more uniform course of reaction. This and other objects of the present invention may be achieved by a process for preparing a substantially amorphous poly-α-olefin, which includes:

a) preforming a solid catalyst and, optionally, a first amount of a trialkylaluminum cocatalyst, by contacting the catalyst and optionally the cocatalyst with at least one selected from the group including oxygen and a compound which includes active oxygen, to form a preformed catalyst,
   wherein the solid catalyst includes magnesium, aluminum and titanium, and
   wherein said trialkylaluminum cocatalyst includes 1 to 9 carbon atoms in each alkyl group;

b) contacting the preformed catalyst with a second amount of the cocatalyst, wherein a molar ratio of trialkylaluminum to the titanium ranges from 40:1 to 700:1, to form a catalyst mixture;

c) polymerizing, in the liquid phase, with the catalyst mixture, an olefin or an olefin mixture at a temperature between 30 and 160° C., to produce the poly-α-olefin.

Another embodiment of the invention relates to a preformed catalyst for preparing a substantially amorphous poly-α-olefin, which is prepared by a process including:

a) preforming a solid catalyst and, optionally, a first amount of a trialkylaluminum cocatalyst, by contacting the catalyst and optionally the cocatalyst with at least one selected from the group including oxygen and a compound which includes active oxygen, to form a preformed catalyst,
   wherein the solid catalyst includes magnesium, aluminum and titanium, and
   wherein the trialkylaluminum cocatalyst includes 1 to 9 carbon atoms in each alkyl group.

DETAILED DESCRIPTION OF THE INVENTION

Various other objects, features and attendant advantages of the present invention will be more fully appreciated as the same becomes better understood from the following detailed description of the preferred embodiments of the invention.

Preferably, the present invention provides a process for producing a substantially amorphous poly-α-olefin, which includes a) a solid catalyst which is prepared from magnesium halide, aluminum trihalide and titanium tetrahalide is used, b) a trialkylaluminum which has from 1 to 9 carbon atoms in each alkyl group is added as a cocatalyst, so that the molar ratio of trialkylaluminum to titanium is in the range from 40:1 to 700:1, c) the olefin or olefin mixture is polymerized in the liquid phase and at a temperature between 30 and 160° C., and d) the poly-α-olefin formed is isolated, which includes preforming the solid catalyst before the addition of the cocatalyst by addition of a further component which is selected from oxygen and compounds which contain active oxygen.

In general, based on 10 mol of magnesium halide, from 0.5 to 4 mol of aluminum trihalide and from 0.4 to 2 mol of titanium tetrahalide are used here.

The solid catalyst can be prepared, for example, by the process which is disclosed in EP-A-0 335 484, which is hereby expressly incorporated by reference. The halide used is preferably chloride. In addition to magnesium halide, aluminum trihalide and titanium tetrahalide, according to the prior art modifying substances may also be added, in not more than about twice the stoichiometric amount, based on the titanium content of the catalyst, such as, for example, alkylaluminum halides, ethylene oxide, propylene oxide, alkyl halides, dry hydrogen chloride gas and/or aluminoxanes. Preferably no electron donor over and above said substances is added.

Here, a solid catalyst which as a rule contains magnesium, aluminum and titanium in the following amounts is obtained:

from 10 to 25% by weight, preferably from 14 to 22.5% by weight and particularly preferably from 16 to 21% by weight of magnesium, from 1 to 5% by weight, preferably from 1.5 to 4% by weight and particularly preferably from 2 to 3% by weight of aluminum and from 1 to 5% by weight, preferably from 1.5 to 4% by weight and particularly preferably from 2 to 3% by weight of titanium.

For the preforming, the solid catalyst is treated, before the addition of the cocatalyst, by the addition of a further component which is selected from oxygen and compounds which contain active oxygen.

Oxygen may be used either in pure form or as a mixture with other gases, such as, for example, nitrogen or argon. Compounds which contain active oxygen are, for example, organic peroxides, such as, for example, dicumyl peroxide, cumyl hydroperoxide, tert-butyl cumyl peroxide, di-tert-butyl peroxide, tert-butyl hydroperoxide, dibenzoyl peroxide or benzoyl tert-butyl peroxide or hydrogen peroxide.

The absence of an otherwise usual dark coloration of the catalyst suspension on subsequent contact with trialkylaluminum preferably serves as an indication of successful preforming. The minimum amount of oxygen or of the compound which contains active oxygen is determined by the fact that the dark coloration of the catalyst suspension on subsequent contact with trialkylaluminum should be at least substantially reduced. The maximum amount of oxygen or of the compound which contains active oxygen should preferably not considerably exceed the amount which is necessary for the absence of the dark coloration.

The effects obtained according to the invention can frequently be further enhanced if the preforming is additionally carried out in the presence of a compound which contains dissociable hydrogen.

Compounds which contain dissociable hydrogen are primarily water, carboxylic acids, such as, for example, formic acid, acetic acid, propionic acid or butyric acid, alcohols, such as, for example, methanol, ethanol, n-propanol, isopropanol, n-butanol, isobutanol or tert-butanol, ammonia and primary or secondary amines, such as methylamine, dimethylamine, ethylamine, di-n-butylamine, etc. If the compound which contains dissociable hydrogen is metered in, it is especially preferable that the molar ratio of this compound to the titanium tetrachloride does not substantially exceed the value 3:1.

During the preforming, the solid catalyst can be suspended in a liquid phase, it being possible for the liquid phase to be, for example, an inert hydrocarbon or a monomer or monomer mixture. However, the preforming can also be carried out in a fixed bed or in a fluidized bed.

As a result of this preforming, a more stable catalyst system is obtained. Large changes in activity which result in uncontrolled heating up at the beginning of the reaction but in a substantial cooling of the reaction material toward the end in the case of insufficient regulation of heat removal are reduced. The formation of highly active but very poorly resistant catalytically active species must be assumed to be the cause of the considerable decrease in the activity in the course of the reaction according to the prior art. As a result of the catalyst preforming according to the invention, the formation of these species is unexpectedly suppressed in relation to the formation of active centers having higher stability. This results in a more uniform course of the reaction. This effect is superposed by the substantially increased catalyst activity, so that in some cases initial heat evolution greater than that without preforming can nevertheless take place. If, however, correspondingly less of the catalyst preformed according to the invention is used in order to obtain the same conversion as without preforming, the initial temperature increase is always smaller than that according to the prior art.

The catalyst preformed according to the invention can be used directly after its preparation for the polymerization; however, it can also be stored for a relatively long time. Here, the storage time may vary between a few seconds and several days. The storage temperature may be up to 160° C., but a lower temperature should be chosen in the case of prolonged storage. If storage is effected for a relatively long time at a relatively high temperature or if the catalyst is brought to a relatively high temperature after the preparation and preforming, which can occur as a result of conventional heating, as a result of microwave treatment or as a result of ultrasonic treatment, it may be advantageous for the stability of the catalyst if small amounts of the subsequently used monomers are already present. In general, relatively long storage times are associated with a decrease in the catalyst activity.

The olefin to be polymerized can in principle be any α-olefin having up to 12 carbon atoms, for example ethene, propene, 1-butene, 1-hexene, 1-octene, n-decene and/or 1-dodecene. The poly-α-olefin formed preferably has the following monomer composition:

from 0 to 100% by weight of one or more α-olefins having 4 to 12 carbon atoms, from 0 to 100% by weight of propene and from 0 to 50% by weight of ethene.

Particularly preferably, the poly-α-olefin has the composition from 3 to 95% by weight of one or more α-olefins having from 4 to 12 carbon atoms, from 5 to 97% by weight of propene and from 0 to 20% by weight of ethene.

In both cases, 1-butene, 1-hexene and/or 1-octene is preferably used as the α-olefin having from 4 to 12 carbon atoms.

The polymerization can be carried out either batchwise, continuously or semicontinuously. Owing to the higher productivity of the catalyst prepared according to the invention, a higher space-time yield and a lower content of catalyst residues in the product are obtained.

In order to adjust the molecular weight, polymerization can, if desired, be effected according to the conventional methods in the presence of hydrogen or of another suitable regulator. In a first embodiment, a melt viscosity preferably in the range from 300 to 400,000 mPas, particularly preferably from 350 to 200,000 mPas and especially preferably from 400 to 25,000 mPas, measured at 190° C. according to DIN 53019 in a rotational viscometer, is established here. Here, the relevant shear rate is $30.5^{-1}$ in the case of viscosities below 15,000 mPas and $3.5\ s^{-1}$ in the case of viscosities of 15,000 mPas or higher.

The poly-α-olefin prepared according to the invention is substantially amorphous; this is evident, for example, from the softening point and the needle penetration. In a first embodiment, the softening point, measured using the ring-and-ball method according to DIN 52011, is preferably in the range from 80 to 153° C., while the needle penetration (100/25/5), measured according to DIN 52010, is preferably in the range from 18 to 90×0.1 mm. At a specified melt viscosity, softening point and needle penetration can be adjusted in a known manner by variation of the catalyst or of the temperature and by choice of the monomers.

In a second embodiment, linear, extremely high molecular weight poly-α-olefins are prepared by the process according to the invention. Here, use is made of the fact that the activity of the catalyst preformed according to the invention decreases only slowly during the polymerization, which results in high productivity. Since, moreover, this catalyst tends to chain termination reactions only to a small extent, poly-α-olefins having a weight average molecular weight $M_w$ of above 2,000,000 can be prepared therewith. As far as possible no molecular weight regulator is used for obtaining products having such a high molecular weight; in addition, it is expedient to carry out polymerization in a low temperature range, for example at about 40° C. In this way, it is possible to convert even monomers having low reactivity, such as 1-hexene or 1-octene, into polymers having a weight average molecular weight $M_w$ of from 200,000 to about 2,000,000, preferably from 500,000 to about 2,000,000. Such polymers are completely amorphous and rubber-like and can be processed via the melt. They preferably have the following monomer composition:

at least 10% by weight, in particular at least 20% by weight, of 1-hexene and/or 1-octene and not more than 90% by weight, in particular not more than 80% by weight, of ethene, propene and/or 1-butene.

However, such polymers preferably contain no propene and particularly preferably also no ethene. For special applications, the polymers are composed completely of 1-hexene and/or 1-octene.

Such polymers are used, for example, for the bonding layer of self-adhesive tapes.

A preferred embodiment of the invention provides a process for the preparation of substantially amorphous poly-α-olefins having an improved space-time yield under controlled reaction conditions, in which a solid catalyst which is prepared from magnesium halide, aluminum trihalide and titanium tetrahalide is used together with a trialkylaluminum cocatalyst, which includes preforming a suspension that contains the solid catalyst, before the addition of the cocatalyst, by addition of a further component which is selected from oxygen and compounds which contain active oxygen.

An optional first amount of the cocatalyst may be present with the solid catalyst during preforming. After the preforming, a second amount of cocatalyst is added. The second amount of cocatalyst is greater than the first amount. Preferably, the second amount is 10 times or more greater than that of the first amount; more preferably 25 times or more; more particularly preferably 50 times or more; more especially preferably 100 times or more; most preferably 125 times or more; most particularly preferably 200 times or more. These ranges include all values and subranges therebetween.

EXAMPLES

Having generally described this invention, a further understanding can be obtained by reference to certain specific examples which are provided herein for purposes of illustration only and are not intended to be limiting unless otherwise specified.

In the Examples which follow, a commercially available catalyst according to a preferred embodiment of the invention, which, according to analysis, contains 2.3% by weight of Ti, 18.7% by weight of Mg and 2.6% by weight of Al was used.

Example 1 a) Preforming of the Catalyst:

10 ml of moist oxygen were passed into a suspension of 0.025 g of the catalyst and 4.3 mg of triisobutylaluminum (1.79 mol, based on 1 mol of titanium) in 2.5 ml of n-hexane at 25° C. while stirring in the course of 1 minute. Thereafter, the gas space was flushed with argon until complete displacement of the oxygen and the mixture was then stored for 5 days at 25° C.

Successful preforming was indicated by the fact that the otherwise usual dark coloration was absent when triisobutylaluminum was subsequently added.

b) Carrying out the Polymerization:

720 g of propene, 330 g of 1-butene, 0.2 g of triisobutylaluminum and 11.0 liters (S.T.P.) of hydrogen were added to 450 g of butane in a 5 liter stainless steel autoclave, after which the mixture was heated to 70° C. A mixture of 0.23 g of triisobutylaluminum and the suspension of the catalyst preformed according to a) was then introduced into the reactor. In the subsequent polymerization reaction, the maximum deviation of the actual temperature from the required temperature was only 6° C.

After a reaction time of 180 minutes, the catalyst was decomposed by adding 5 ml of methanol; in addition, 5 ml of a solution of 20% by weight of a stabilizer (Irganox 1010) in acetone were added. Thereafter, the solvent and the remaining residual monomers were let down and the reactor content was removed from the reactor by melting at 170° C. The yield was 934 g (conversion 89.0%). The product had a melt viscosity of 4200 mPas, a needle penetration of 22×0.1 mm and a softening point of 122° C.

Example 2 (Not According to the Invention)

As in Example 1, with the only difference that the catalyst was not preformed. During the polymerization, the maximum deviation of the actual temperature from the required temperature was 16° C. Yield 748 g (conversion 71.2%); melt viscosity 2800 mPas; needle penetration 16×0.1 mm; softening point 131° C.

Example 3 a) Preforming of the Catalyst: as in Example 1.

b) Carrying out the Polymerization:

740 g of propene, 310 9 of 1-butene, 0.2 g of triisobutylaluminum and 11 liters (S.T.P.) of hydrogen were added to 450 g of butane in a 51 stainless steel autoclave, after which the mixture was heated to 70° C. A mixture of 0.23 g of triisobutylaluminum and the suspension of the catalyst preformed according to a) was then introduced into the reactor. In the subsequent polymerization reaction, the maximum deviation of the actual temperature from the required temperature was only 6° C.

After a reaction time of 180 minutes, the batch was worked up as in Example 1. Yield 785 g (conversion 74.8%); melt viscosity 2000 mPas; needle penetration 20×0.1 mm; softening point 124° C.

Example 4 (Not According to the Invention)

As in Example 3, with the only difference that the catalyst was not preformed. During the polymerization, the maximum deviation of the actual temperature from the required temperature was 13° C. Yield 748 g (conversion 71.2%); melt viscosity 5350 mPas; needle penetration 28×0.1 mm; softening point 132° C.

Example 5 a) Preforming of the Catalyst:

5 ml of moist oxygen were passed into a suspension of 0.037 g of the catalyst and 1.78 mg of triisobutylaluminum (0.5 mol. based on 1 mol of titanium) in 3.7 ml of n-hexane at 25° C. while stirring in the course of 1 minute. Thereafter, the gas space was flushed with argon until complete displacement of the oxygen and the mixture was then stored for 5 days at 25° C. Successful preforming was indicated by the fact that the otherwise usual dark coloration was absent when triisobutylaluminum was subsequently added.

b) Carrying out the Polymerization:

620 g of propene, 410 g of 1-butene, 20 g of ethene, 0.2 g of triisobutylaluminum and 9 liters (S.T.P.) of hydrogen were added to 450 g of butane in a 5 liter stainless steel autoclave, after which the mixture was heated to 85° C. A mixture of 0.34 g of triisobutylaluminum and the suspension of the catalyst preformed according to a) was then introduced into the reactor. In the subsequent polymerization reaction, the maximum deviation of the actual temperature from the required temperature was only 7° C.

After a reaction time of 180 minutes, the catalyst was decomposed by adding 5 ml of methanol; in addition, 5 ml of a solution of 20% by weight of stabilizer (Irganox 1010) in acetone were added. Thereafter, the solvent and the remaining residual monomers were let down and the reactor content was removed from the reactor by melting at 170° C. The yield was 944 g (conversion 91.7%). The product had a melt viscosity of 1900 mPas, a needle penetration of 36×0.1 mm and a softening point of 115° C.

Example 6 (Not According to the Invention)

As in Example 5, but with the only difference that the catalyst was not preformed. During the polymerization, the maximum deviation of the actual temperature from the required temperature was 16° C. Yield 928 g (conversion 88.4%); melt viscosity 1600 mPas; needle penetration 39×0.1 mm; softening point 113° C.

Example 7 a) Preforming of the Catalyst:

A suspension of 0.025 g of the catalyst in 2.5 ml of n-hexane was drawn into a syringe at 25° C. Thereafter, a dry gas mixture comprising 21% by volume of oxygen and 79% by volume of nitrogen was aspirated and the syringe was shaken vigorously for one minute. An approximately six-fold molar excess of oxygen, based on the titanium content of the catalyst, was used here. Successful preforming was indicated by the fact that the otherwise usual dark coloration was absent when triisobutylaluminum was subsequently added.

b) Carrying out the Polymerization:

740 g of propene, 310 g of 1-butene, 0.2 g of triisobutylaluminum and 3 liters (S.T.P.) of hydrogen were added to 450 g of butene in a 5 liter stainless steel autoclave, after which the mixture was heated to 70° C. A mixture of 0.23 g of triisobutylaluminum and the suspension of the catalyst preformed according to a) was then introduced into the reactor. In the subsequent polymerization reaction, the maximum deviation of the actual temperature from the required temperature was 12° C.

After a reaction time of 180 minutes, the catalyst was decomposed by adding 5 ml of methanol; in addition 5 ml of a solution of 20% by weight of the stabilizer Irganox 1010 in acetone were added. Thereafter, the solvent and the remaining residual monomers were let down and the reactor content was removed from the reactor by melting at 170° C. The yield was 889 g (conversion 84.7%). The product had a melt viscosity of 6100 mPas and a needle penetration of 24×0.1 mm.

Example 8 (Not According to the Invention)

As in Example 7, with the only difference that the catalyst was not preformed. During the polymerization, the maximum deviation of the actual temperature from the required temperature was 8° C. Yield 724 g (conversion 69.0%). Melt viscosity 4800 mPas; needle penetration 23×0.1 mm.

Example 9 a) Preforming of the Catalyst:

A suspension of 0.094 g of the catalyst in 9.4 ml of n-hexane was drawn into a syringe at 25° C. Thereafter, a dry gas mixture comprising 21% by volume of oxygen and 79% by volume of nitrogen was aspirated and the syringe was shaken vigorously for one minute. An approximately two-fold molar excess of oxygen, based on the titanium content of the catalyst, was used here.

Successful preforming was indicated by the fact that the otherwise usual dark coloration was absent when triisobutylaluminum was subsequently added.

b) Carrying out the Polymerization:

750 g of 1-hexene and 0.44 g of triisobutylaluminum were added to 1460 g of hexane in a 5 liter stainless steel autoclave, after which the mixture was heated to 50° C. A mixture of 0.44 g of triisobutylaluminum and the suspension of the catalyst preformed according to a) was then introduced into the reactor. In the subsequent polymerization reaction, the maximum deviation of the actual temperature from the required temperature was 2° C.

After a reaction time of 120 minutes, the catalyst was decomposed by adding 5 ml of methanol; in addition 5 ml of a solution of 20% by weight of the stabilizer Irganox 1010 in acetone were added. The product was then precipitated in isopropanol and dried. The yield was 455 g (conversion 60.7%). The molecular weight determination by means of gel permeation chromatography gave a weight average molecular weight Mw of 1,185,300.

Example 10 (Not According to the Invention)

As in Example 9, with the only difference that the catalyst was not preformed. During the polymerization, the maximum deviation of the actual temperature from the required temperature was 1° C. Yield 392 g (conversion 52.3%); $M_w$=1,274,300.

The entire contents of each of the above-mentioned references, patents, applications and published applications are hereby incorporated by reference, the same as if set forth at length.

This application is based on German Patent Application Nos. 19941591.9, filed on Sep. 1, 1999, and 10031293.4, filed on Jun. 27, 2000, the entire contents of each of which are hereby incorporated by reference, the same as if set forth at length.

Obviously, numerous modifications and variations of the present invention are possible in light of the above teachings. It is therefore to be understood that within the scope of the appended claims, the invention may be practiced otherwise than as specifically described herein.

What is claimed is:

1. A process comprising:
   a) contacting a solid catalyst and, optionally, a first amount of a trialkylaluminum cocatalyst, with oxygen to form a preformed catalyst, wherein said solid catalyst comprises magnesium, aluminum and titanium, and wherein said trialkylaluminum cocatalyst comprises 1 to 9 carbon atoms in each alkyl group;
   b) contacting said preformed catalyst with a second amount of said cocatalyst, wherein a molar ratio of said cocatalyst to said titanium is from 40:1 to 700:1, to form a catalyst mixture;
   c) polymerizing, in the liquid phase, an α-olefin or a mixture of α-olefins, in the presence of said catalyst mixture, at a temperature between 30 and 160° C., to produce a substantially amorphous poly-α-olefin,
      wherein the poly-α-olefin comprises the following polymerized monomer composition:
         from 0 to 100% by weight of one or more α-olefins having from 4 to 12 carbon atoms,
         from 0 to 100% by weight of propene, and
         from 0 to 50% by weight of ethene.

2. The process of claim 1, wherein the solid catalyst is contacted with oxygen in the presence of an electron donor selected from the group consisting of an alkyl aluminum halide, ethylene oxide, propylene oxide, an alkyl halide, dry hydrogen chloride gas, an aluminoxane and mixtures thereof.

3. The process of claim 1, wherein the solid catalyst is contacted with oxygen in the presence of a compound which comprises dissociable hydrogen.

4. The process as claimed in claim 1, further comprising isolating said poly-α-olefin.

5. The process as claimed in claim 1, further comprising preparing said solid catalyst from magnesium halide, aluminum trihalide and titanium tetrahalide.

6. The process as claimed in claim 5, wherein the solid catalyst is prepared from 0.5 to 4 mol of aluminum trihalide and 0.4 to 2 mol of titanium tetrahalide, based on 10 mol of magnesium halide.

7. The process as claimed in claim 1, wherein the solid catalyst comprises:
   from 10 to 25% by weight of magnesium,
   from 1 to 5% by weight of aluminum, and
   from 1 to 5% by weight of titanium.

8. The process as claimed in claim 1, wherein the solid catalyst comprises:
   from 14 to 22.5% by weight of magnesium,
   from 1.5 to 4% by weight of aluminum, and
   from 1.5 to 4% by weight of titanium.

9. The process as claimed in claim 1, wherein said solid catalyst comprises:
   from 16 to 21% by weight of magnesium,
   from 2 to 3% by weight of aluminum, and
   from 2 to 3% by weight of titanium.

10. The process as claimed in claim 1, wherein the solid catalyst is present in suspension, in a fixed bed, or in a fluidized bed.

11. The process as claimed in claim 1, wherein the poly-α-olefin comprises the following polymerized monomer composition:
    from 3 to 95% by weight of one or more α-olefins having from 4 to 12 carbon atoms,
    from 5 to 97% by weight of propene, and
    from 0 to 20% by weight of ethene.

12. The process as claimed in claim 11, wherein at least one α-olefin is selected from the group consisting of 1-butene, 1-hexene, 1-octene, and mixtures thereof.

13. The process as claimed in claim 1, wherein said poly-α-olefin comprises the following polymerized monomer composition:
    at least 10% by weight of at least one selected from the group consisting of 1-hexene and 1-octene; and
    not more than 90% by weight of propene, 1-butene or a mixture thereof with ethene, and
    wherein the ethene is present in an amount of from 0 to 50%.

14. The process of claim 13, wherein the α-olefin or the mixture of α-olefins is polymerized until a poly-α-olefin having a weight average molecular weight of from 200,000 to 2,000,000 is produced.

15. The process as claimed in claim 1, wherein the α-olefin or the mixture of α-olefins is polymerized in the presence of a molecular weight regulator.

16. The process as claimed in claim 1, wherein both the first and the second amounts of trialkylaluminum cocatalyst are present and the second amount is greater than the first amount.

17. The process as claimed in claim 16, wherein both the first and the second amounts of trialkylaluminum cocatalyst are present and the second amount is 10 times or more greater than the first amount.

18. The process of claim 1, wherein the α-olefin or the mixture of α-olefins is polymerized until a poly-α-olefin having a melt viscosity of from 300 to 400,000 mPa·s at 190° C. is produced.

19. The process of claim 1, wherein the α-olefin or the mixture of α-olefins is polymerized until a poly-α-olefin having a needle penetration (100/25/5) of from 18 to 90×0.1 mm is produced.

20. The process of claim 1, wherein the α-olefin or the mixture of α-olefins is polymerized until a poly-α-olefin having a softening point of from 80 to 153° C. is produced.

* * * * *